United States Patent [19]

Isahaya

[11] Patent Number: 4,689,709
[45] Date of Patent: Aug. 25, 1987

[54] DIGITAL DISTANCE RELAY

[75] Inventor: Keiji Isahaya, Hyogo, Japan

[73] Assignee: Mitsubishi Denki Kabushiki Kaisha, Tokyo, Japan

[21] Appl. No.: 795,449

[22] Filed: Nov. 6, 1985

[30] Foreign Application Priority Data

Nov. 7, 1984 [JP] Japan .................. 59-233061

[51] Int. Cl.⁴ .............................................. H02H 3/26
[52] U.S. Cl. ....................................... 361/80; 361/85;
364/483; 364/492
[58] Field of Search ............... 361/79, 80, 85; 324/51,
324/57 R; 364/482, 483

[56]  References Cited

U.S. PATENT DOCUMENTS 4,261,038  4/1981  Johns et al. .......................... 364/482
4,344,143  8/1982  Kurosawa et al. ................ 361/80 X
4,377,833  3/1983  Udren ..................................... 361/79
4,507,700  3/1985  Andow et al. ......................... 361/80
4,577,254  3/1986  Yamaura .......................... 364/482 X

OTHER PUBLICATIONS

General Electric Company Limited, Publication R-5283, Type MM3T Static Distance Protection Scheme 399/3940, Jun. 25, 1975.

Primary Examiner—A. D. Pellinen
Assistant Examiner—Derek S. Jennings
Attorney, Agent, or Firm—Bernard, Rothwell & Brown

[57]  ABSTRACT

In a digital distance relay, the distance measuring operation is performed only regarding the phase on duty in the third step if there is no fault, and it is performed regarding either the third and first steps or the third and second steps if a fault is detected within the third step. Thereby the processing time for the distance measuring operation may be reduced is that corresponding to two steps per sampling.

3 Claims, 5 Drawing Figures

DIGITAL DISTANCE RELAY

BACKGROUND OF THE INVENTION

1. Field of the Invention

The present invention relates to digital distance relays, and more specifically to a digital distance relay wherein each of N phases on duty among six phases has distance measuring elements in steps 1-3.

2. Description of the Prior Art

FIG. 1 shows an example of a digital distance relay in the prior art. In FIG. 1, the digital distance relay 1 receives an analog signal which is the output of a current transformer (hereinafter referred to as "CT") installed on transmission lines 2 to be protected and a potential transformer (hereinafter referred to as "PT") installed on bus lines 3 connected to the transmission lines 2 to be protected, and performs the distance measuring operation.

FIG. 2 shows an example of the constitution of the digital distance relay, and the analog signal from the CT, PT is introduced in an analog input member 4. The analog input member 4 comprises an input transformer 5, filters 6, a sample-and-hold circuit 7 (hereinafter referred to as "SH"), a multiplexer 8, an A-D converter 9 (hereinafter referred to as "AD"), a clock signal generator 10. A continuous signal inputted in the analog input member 4 is converted into a discrete digital signal.

Next, the digital signal is introduced in a computer member 11. The computer member 11 comprises a central processing unit 12 (hereinafter referred to as "CPU"), a setting circuit 13 being a sort of memory to store information for the reach setting of the distance relay and time setting of a timer, a read only memory 14 (hereinafter referred to as "ROM") to store software for the distance measuring operation, a randon access memory 15 (hereinafter referred to as "RAM") to store the input signal, the operation result etc., a digital input circuit 16 (hereinafter referred to as "DI") being a circuit to introduce external conditions such as a pallet condition of a circuit breaker, a digital output circuit 17 (hereinafter referred to as "DO") for outputting the trip command to the circuit breaker based on the decision result of the relay.

The digital signal from the analog input member 4 is transferred to the RAM 15 in the computer member 11 by a direct memory access circuit 18 (hereinafter referred to as "DMA"). The CPU 12 performs the operation processing of the digital signal according to the software stored in the ROM 14.

FIG. 3 is a flow chart illustrating the constitution of a conventional software to perform the operation processing of the digital signal. In FIG. 3, the operation from the starting up to the ending is performed during one sampling period. Here the term "sampling" means operation to take input data as performed in a digital protective relay, that is, operation to receive the analog signal from the PT or CT installed in the power system and to take the instantaneous value at every definite period (for example, at electric angle of 30 degrees in the rated frequency).

In FIG. 3, symbols 1ab, 1bc, ..., 3c represent the processing of step 1 phase AB distance measuring operation, step 1 phase BC distance measuring operation, ..., step 3 phase C distance measuring operation, respectively.

The digital distance relay is provided with the distance measuring elements to perform the measurement of steps 1-3 in each of six phases of AB, BC, CA, A, B, C, i.e. a total of 18 elements. The distance measuring operation is repeated 18 times simply in sequence of 1ab, 1bc, ..., 3c corresponding to the 18 distance measuring elements per sampling.

Content of the distance measuring operation varies depending on the characteristics of individual distance measuring elements. For example, in the case of mho characteristics shown in FIG. 4, operation vector $E_{OP}$ and reference vector $E_{POL}$ are prepared according to following table. Decision is effected regarding whether or not the phase difference between the operation vector $E_{OP}$ and the reference vector $E_{POL}$ is within 90°, and if it is within 90° the operation signal is outputted.

| phase | $E_{OP}$ | $E_{POL}$ |
|-------|----------|-----------|
| AB | $V_{AB} - Z_F \cdot I_{AB}$ | $-V_{AB}$ |
| BC | $V_{BC} - Z_F \cdot I_{BC}$ | $-V_{BC}$ |
| CA | $V_{CA} - Z_F \cdot I_{CA}$ | $-V_{CA}$ |
| A | $V_A - Z_F(I_A + K \cdot 3I_o)$ | $-V_{BC} \angle 90°$ |
| B | $V_B - Z_F(I_B + K \cdot 3I_o)$ | $-V_{CA} \angle 90°$ |
| C | $V_C - Z_F(I_C + K \cdot 3I_o)$ | $-V_{AB} \angle 90°$ |

$Z_F$: reach of mho characteristics
K: zero sequence current compensation coefficient Since the software of the distance measuring operation in the conventional digital distance relay is constituted as above described, the total operation processing time from the starting up of the operation to the ending thereof becomes approximately 18 times as large as the operation processing time per phase and step.

The operation time per phase and step is for the operation processing including multiplication and phase difference calculation as above described and therefore becomes relatively long. Consequently, if the total operation processing time should be contained within one sampling period, the sampling period must be made long. As a result, the operation finishing time of the distance relay cannot be made sufficiently fast.

SUMMARY OF THE INVENTION

An object of the invention is to provide a digital distance relay which eliminates disadvantages in the prior art and is useful.

Another object of the invention is to provide a digital distance relay which requires only the distance measuring operation of 2N in number (N: the number of phases on duty) per sampling.

Other objects and advantages of the invention will be better understood from the following detailed description of embodiments taken in connection with the accompanying drawings.

A digital distance relay as an embodiment of the invention is provided with distance measuring elements of steps 1-3 in each of the phases on duty among six phases. It has three means, that is, means for performing the distance measuring operation normally regarding the phase on duty of the third step per sampling, means for performing the distance measuring operation regarding the phase on duty of the first step per sampling before the finishing of counting by a timer of the second step which begins the counting from the defect detecting time by the distance measuring operation, and means for performing the distance measuring operation regarding the phase on duty at the second step per sampling after the finishing of counting by the timer of the second step.

PREFERRED EMBODIMENT OF THE INVENTION

Figure 5:
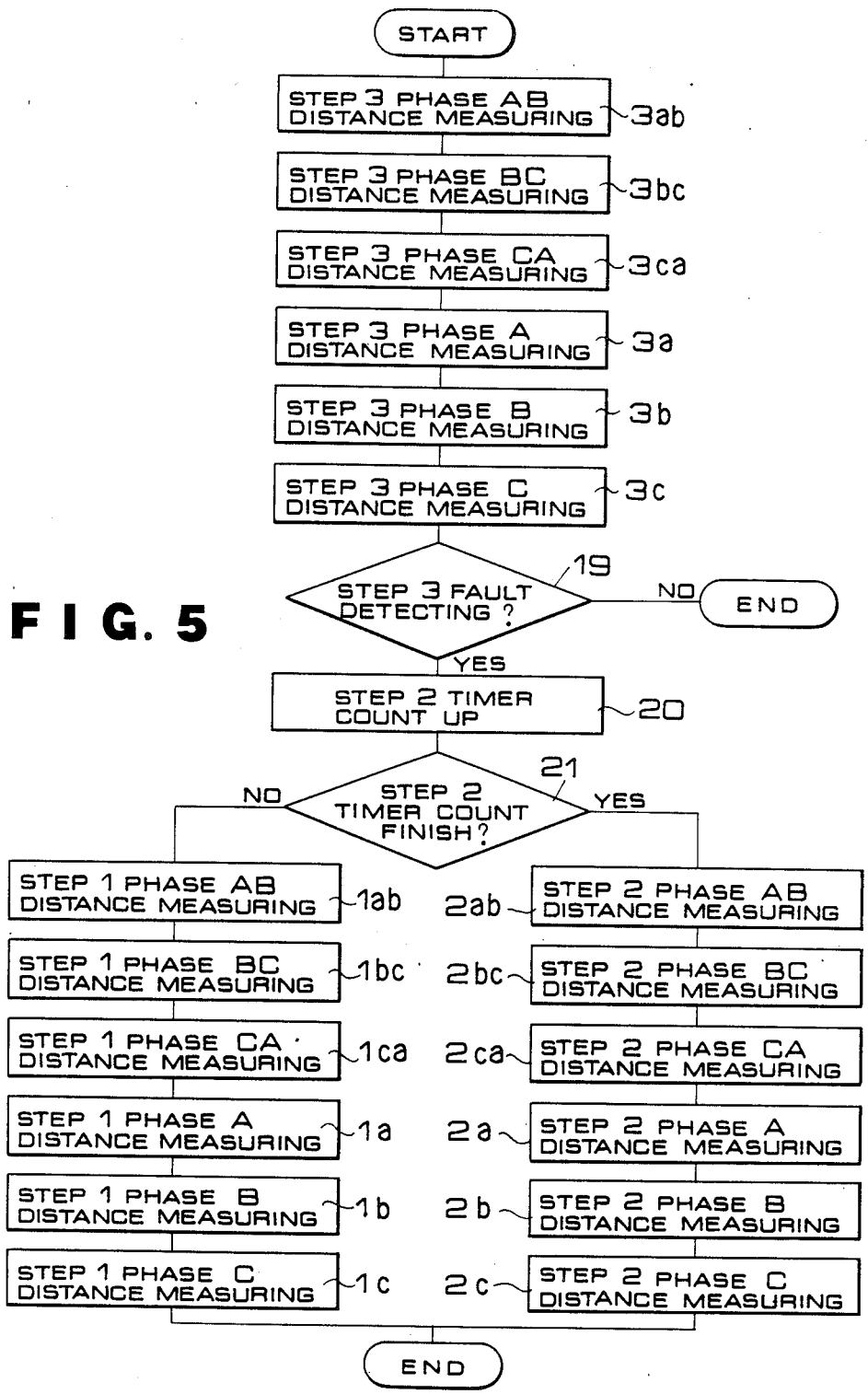
FIG. 5 is a flow chart illustrating the constitution of the software of the distance measuring operation in a digital distance relay as an embodiment of the invention.

An embodiment of the invention will now be described referring to the accompanying drawings. FIG. 5 shows a flow chart illustrating the constitution of the software of a distance measuring operation in a digital distance relay of the invention. In FIG. 5, operation from the starting of the operation up to the ending thereof is performed during one sampling period in a similar manner to FIG. 3.

In FIG. 5, symbols 1ab, 1bc, . . . , 3c represent the processing of step 1 phase AB distance measuring operation, step 1 phase BC distance measuring operation, . . . , step 3 phase C distance measuring operation, respectively. Numeral 19 designates the processing of the decision whether or not fault detection within the third step by the step 3 distance measuring operation exists, numeral 20 the process to count up the timer of the second step, and numeral 21 the decision whether or not the timer of the second step finishes the counting.

The digital relay of the invention is provided with the distance measuring elements to perform the measurement of steps 1-3 in each of six phases of AB, BC, CA, A, B, C, i.e. total 18 elements. However, according to software stored in the ROM 14 of the computer member 11, the distance measuring operation regarding phases of AB, BC, CA, A, B, C in the third step is normally performed per sampling in sequence of 3ab, 3bc, . . . , 3c shown in FIG. 5. If a fault is not detected within the third step, the operation processing in the sampling period is finished.

If fault is detected within the third step, count up of the timer in the second step is performed in processing step 20, and further the decision whether or not the timer of the second step finishes the counting is effected in processing step 21.

If the timer of the second step does not finish the counting, the distance measuring operation regarding phases of AB, BC, CA, A, B, C in the first step is performed in sequence of 1ab, 1bc, . . . , 1c as shown in FIG. 5, and the operation processing in the sampling period is finished. If the timer of the second step finished the counting, the distance measuring operation regarding phases of AB, BC, CA, A, B, C in the second step is performed in sequence of 2ab, 2bc, . . . , 2c shown in the figure, and the operation processing in the sampling period is finished.

Thus, if a fault is not detected within the third step, the distance measuring operation is performed only 6 times per sampling. Even if a fault is detected within the third step, the distance measuring operation is performed only 12 times in the third and first steps or the third and second steps.

Figure 1:
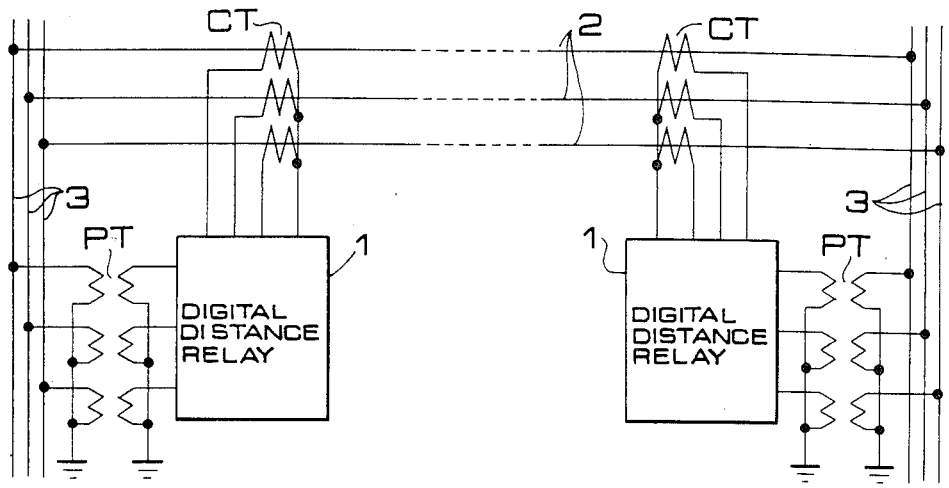
FIG. 1 is a systematic diagram showing an example of a power transmission system in which a digital distance relay is used.
Figure 4:
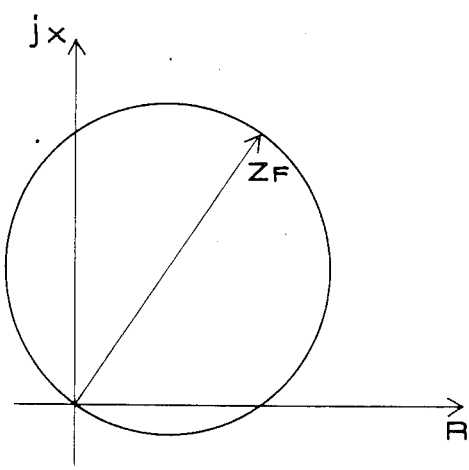
FIG. 4 is a diagram of mho characteristics.
Figure 2:
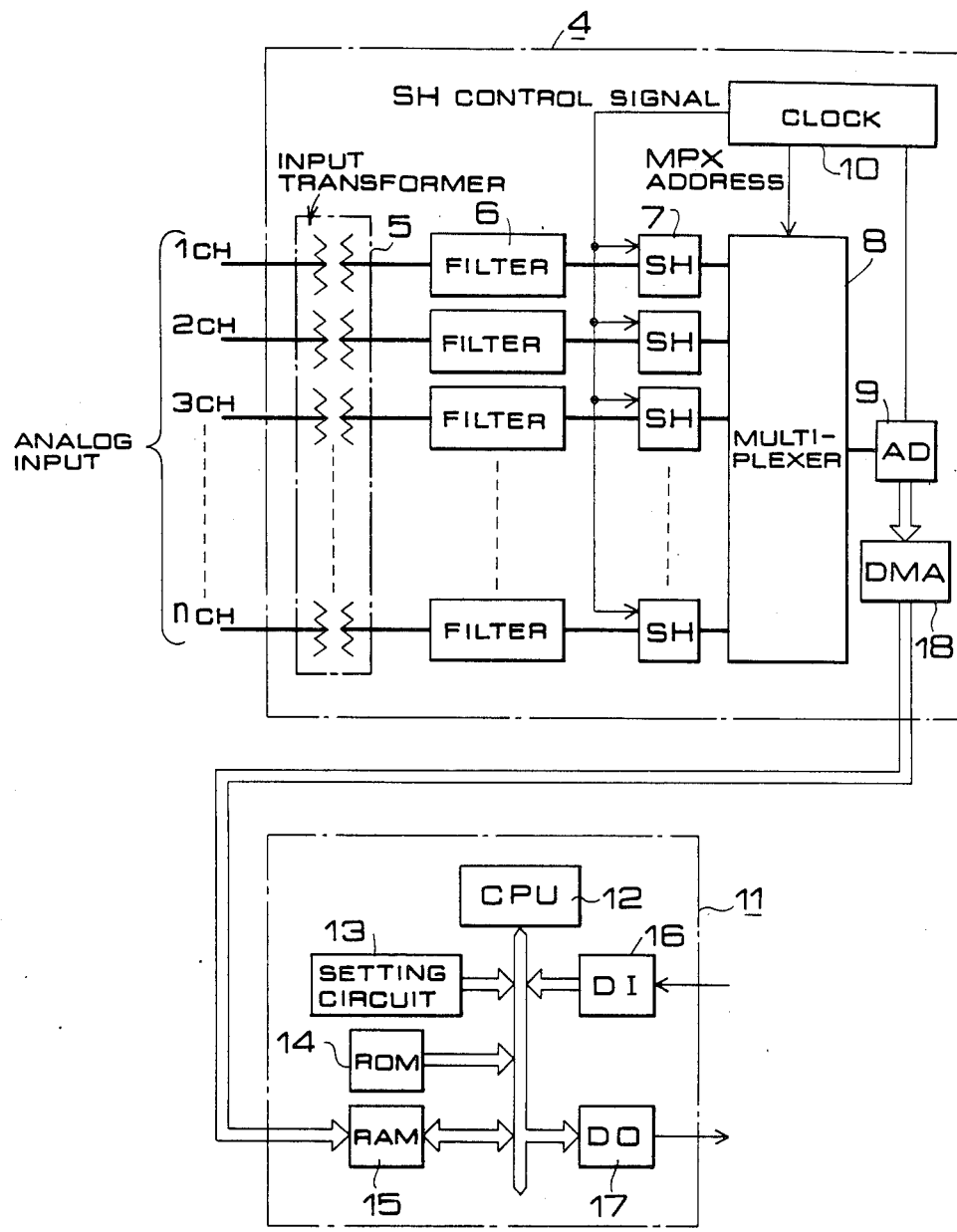
FIG. 2 is a block diagram illustrating the constitution of a digital relay.
Figure 3:
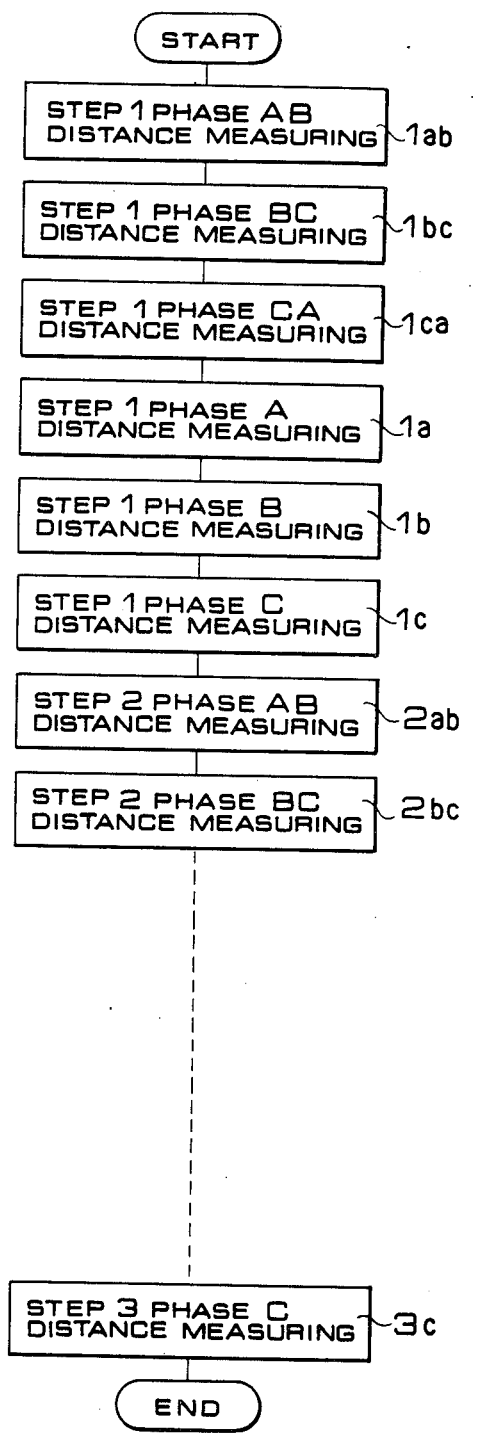
FIG. 3 is a flow chart illustrating the constitution of the software of a digital distance relay in the prior art.

The content of the distance measuring operation is similar to that in FIG. 3.

The reason the distance measuring operation in the first step or the second step is not required when a fault is not detected within the third step is that since the detecting range of the distance measuring elements in the third step includes the detecting range of the distance measuring elements in the first step and the second step, if a fault is not detected within the third step, it cannot be detected in the first step or the second step.

The reason that the distance measuring operation of either the first step or the second step may be performed in the same sampling period when a fault is detected in the third step is that the detecting range of the distance measuring elements in the second step includes the detecting range of the distance measuring elements in the first step and if the fault is within the first step and instantaneous operation signal is outputted from the first step before the finishing of the counting by the timer in the second step the fault is cleared and the distance measuring operation in the second step becomes unnecessary, and that if the fault is within the second step outside the first step the distance measuring operation in the first step is unnecessary.

Also when the digital relay is used in a directional comparison carrier relay system, regarding a fault within the third step as including faults within the first and second steps, the distance measuring operation is performed in the first step and the third step per sampling before the finishing of the counting by the timer in the second step. Since the output of the distance measuring elements in the first step and the third step is used and the output of the distance measuring elements in the second step is not used in the directional comparison carrier relay as well known, the operation is sufficient. After the finishing of the counting by the timer in the second step, the function of the directional comparison carrier relay system is stopped and thereby the operation is of course sufficient.

The system of this invention which operates either the first step or the second step, can also be used as it is in the directional comparison carrier relay system.

Although the embodiment is described in the digital distance relay with six phases of AB, BC, CA, A, B, C all on duty, a digital distance relay with N phases (N=1-6) being on duty among six phases of AB, BC, CA, A, B, C may be usually used and performs a similar effect to that in the embodiment.

According to the invention as above described, regarding the distance measuring elements in three steps, when a fault is not detected within the third step and when a fault is detected within the third step, the software is constituted so that the distance measuring operation corresponding to two steps at most is performed per sampling, thereby the operation time may be reduced and the sampling period also may be reduced and the digital distance relay has the effect of detecting a fault at high speed.

What is claimed is:

1. A method of measuring distance in a digital distance relay to perform the measurement of steps 1-3 in each of N phases on duty among six phases, said method comprising:

performing the distance measuring operation normally regarding the phase on duty of the third step per sampling;

performing the distance measuring operation regarding the phase on duty of the first step per sampling before the counting finishing of a timer of the second step which begins the counting from the fault detecting time by the distance measuring operation of the third step; and performing the distance measuring operation regarding the phase on duty at the second step per sampling after the counting finishing of the timer of the second step.

2. A method as set forth in claim 1, wherein N phases (N=1-6) among six phases of AB, BC, CA, A, B, C in the relay are on duty.

3. A method of measuring distance in a digital distance relay for a three-phase transmission system having phases A, B and C, the method comprising the steps of:

sampling and holding measurements of voltages and currents of each phase of the transmission system at each of three successive spaced time points 1, 2 and 3;

converting the measurements of voltages and currents of each successive time point 1, 2 and 3 to digital values;

storing the digital values of the converting step;

performing first distance measurement calculations for phase A to B, phase C to A, phase B to C, phase A to ground, phase B to ground, and phase C to ground from stored digital values of the measurements of time point 3 to detect a fault in the transmission system;

ending the procedure concerning distance measurement regarding time points 1, 2 and 3 when no fault is detected in the step for performing first distance measurement calculations;

starting a timer when a fault is detected in the step of performing first distance measurement calculations;

performing second distance measurement calculations for phase A to B, phase B to C, phase C to A, phase A to ground, phase B to ground and phase C to ground from stored digital values of the measurements of time point 1 when the time count is not finished; and performing third distance measurement calculations for phase A to B, phase B to C, phase C to A, phase A to ground, phase B to ground, and phase C to ground from stored digital values of the measurements of time point 2 when the time count is finished.

* * * * *